United States Patent [19]

Dumas et al.

[11] Patent Number: 4,619,191
[45] Date of Patent: Oct. 28, 1986

[54] APPARATUS FOR THAWING, HANDLING AND REHEATING SEALED FROZEN FOOD PACKETS

[76] Inventors: Gérard Dumas, 2601 Clément Street, Charlesbourg, Canada, G2N 1A1; Jean A. Marcoux, 260 Jardin des Cascades, Beauport, Canada, G1E 6J5

[21] Appl. No.: 663,090

[22] Filed: Oct. 22, 1984

[51] Int. Cl.$^4$ ............................................. A23L 1/00
[52] U.S. Cl. ......................................... 99/483; 62/63; 99/517; 104/73; 126/379; 272/26; 272/32; 273/140
[58] Field of Search ................ 99/483, 517; 104/59, 104/69, 71, 73, 86; 272/26, 32, 71, 72; 273/139, 140; 62/63; 126/379

[56] References Cited

U.S. PATENT DOCUMENTS

| 930,613 | 8/1909 | Pressey | 273/140 |
| 1,331,270 | 2/1920 | Lippincott | 272/26 |
| 2,604,055 | 7/1952 | Snowden | 104/73 |
| 3,498,208 | 3/1970 | Longe et al. | 99/483 |

FOREIGN PATENT DOCUMENTS 0682238 8/1979 U.S.S.R. ............................ 272/32

Primary Examiner—Edward L. Roberts

[57] ABSTRACT

An apparatus for heating or cooling sealed food pouches, another apparatus for moving the same and a third apparatus adapted to transfer the pouches are disclosed. The three apparatuses are designed to function as an integrated food pouch handling system, but may also be used separately. The first apparatus consists of a large bath partially filled with circulating hot or cold liquid, following a course in which whirlpools are created. The food pouches are placed in the bath and are carried by the moving liquid until they have attained the desired temperature. The second apparatus consists of a conveyor mounted on a cart. The conveyor is tiltable so that one end thereof can be placed in the bath to automatically retrieve the food pouches. The third apparatus is a large vat to receive the food pouches placed therein by the conveyor. The vat is rotatable about its vertical axis, being mounted on a base provided with wheels whereby the vat can be pushed to transfer the food pouches to another location in a large capacity kitchen.

5 Claims, 8 Drawing Figures

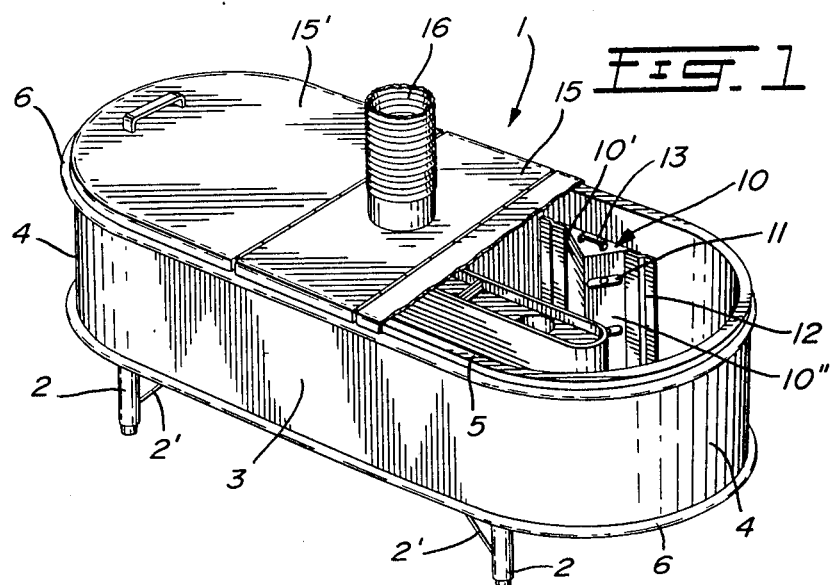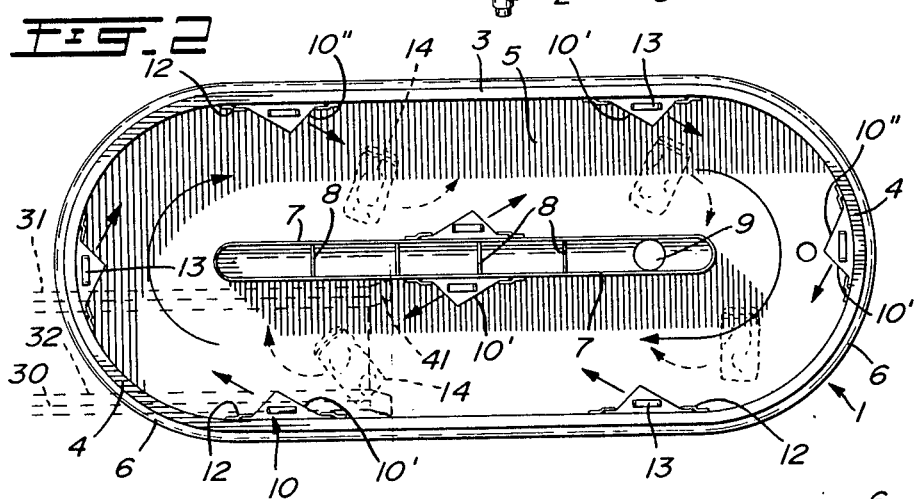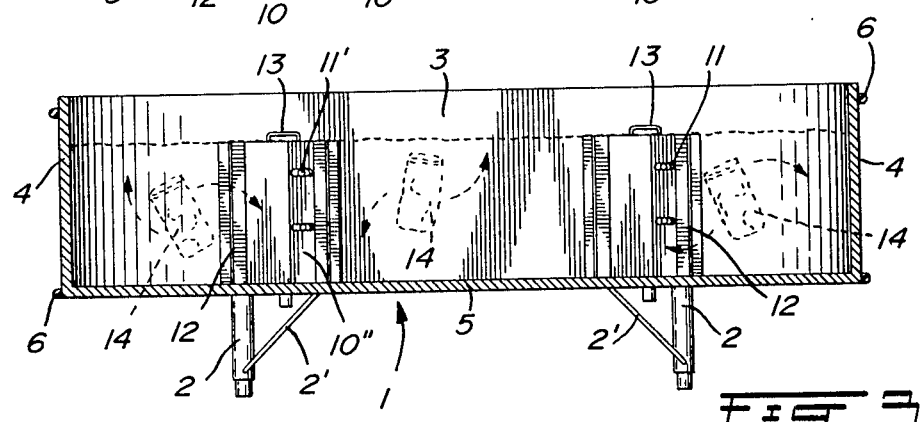

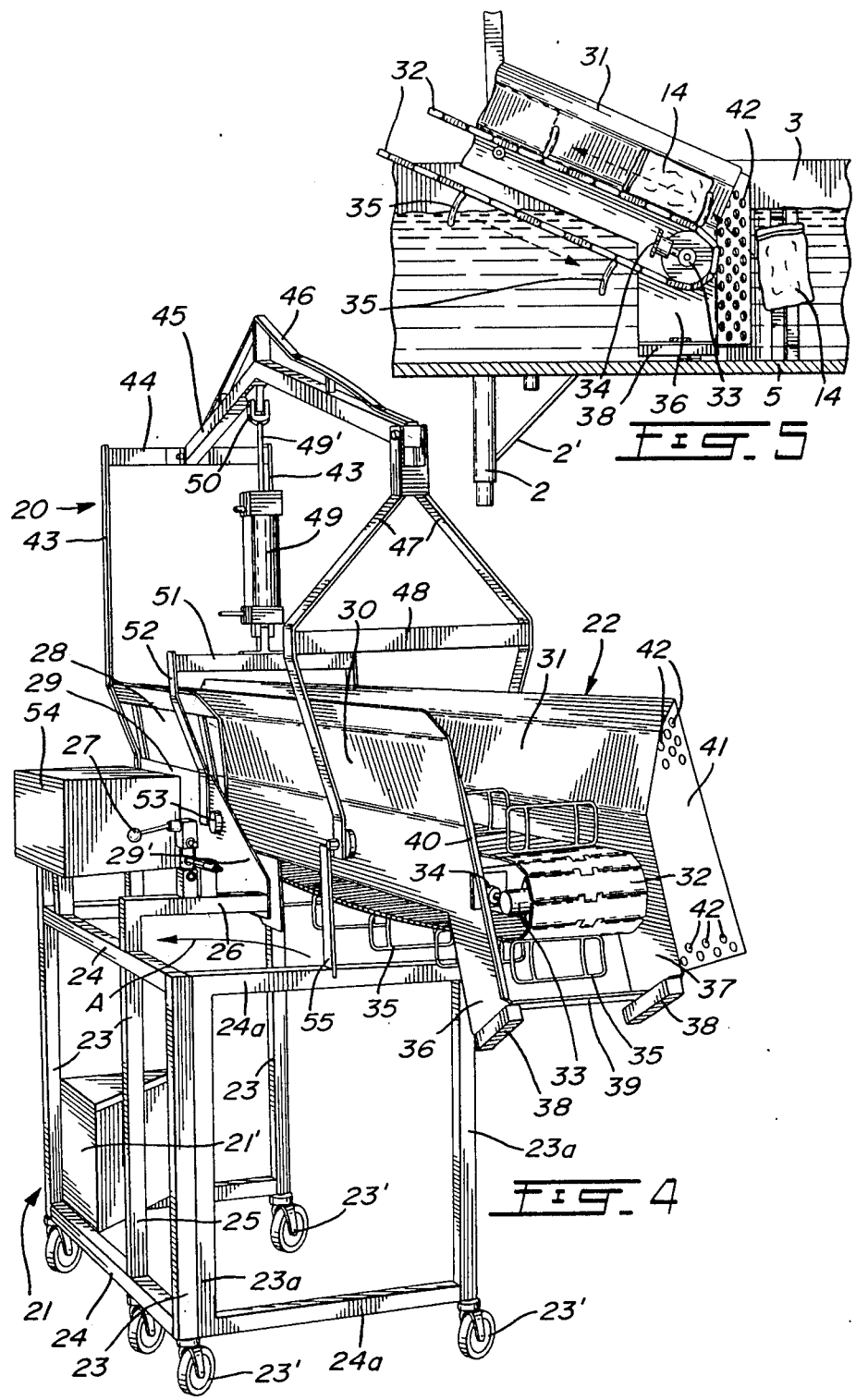

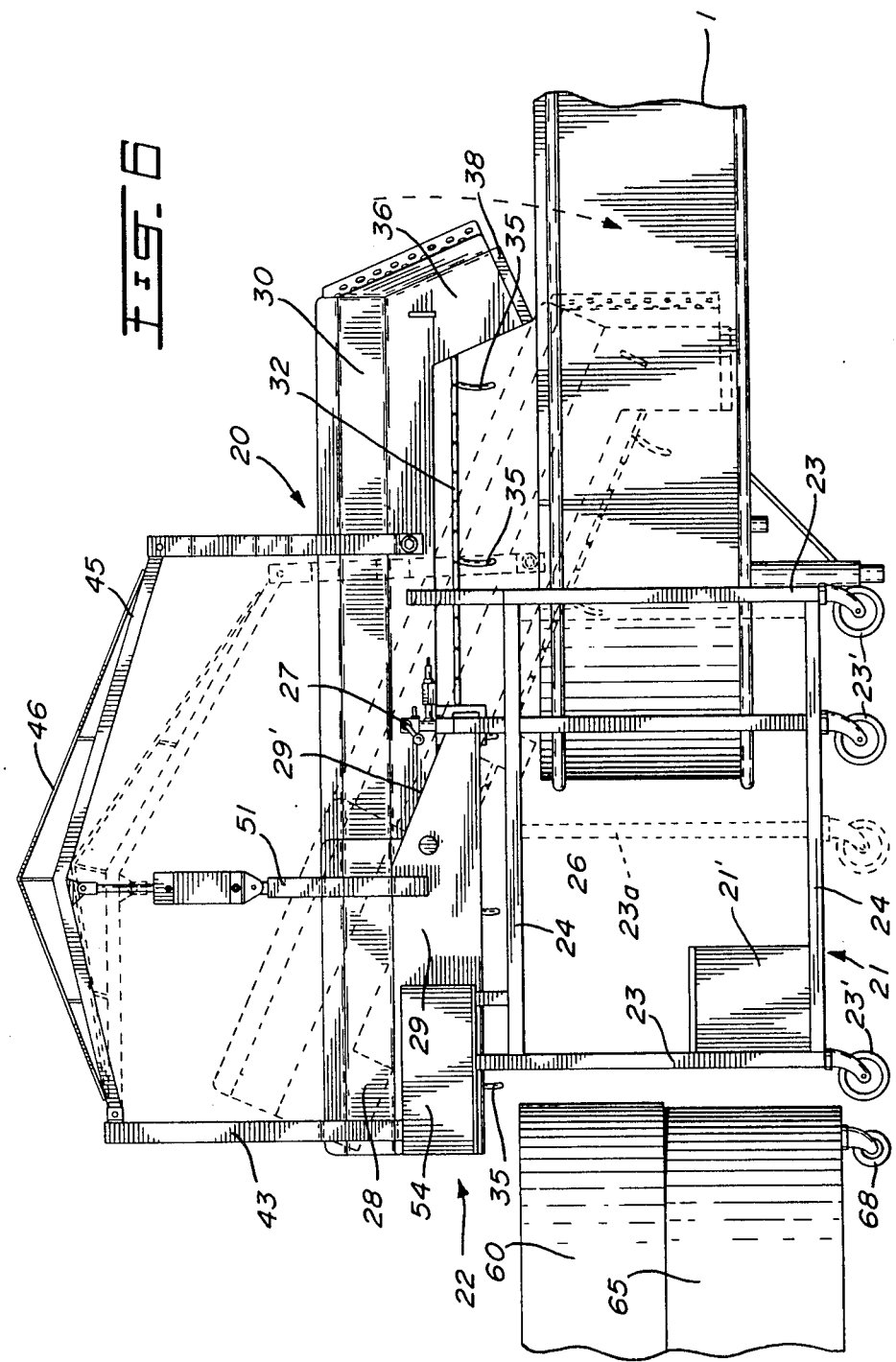

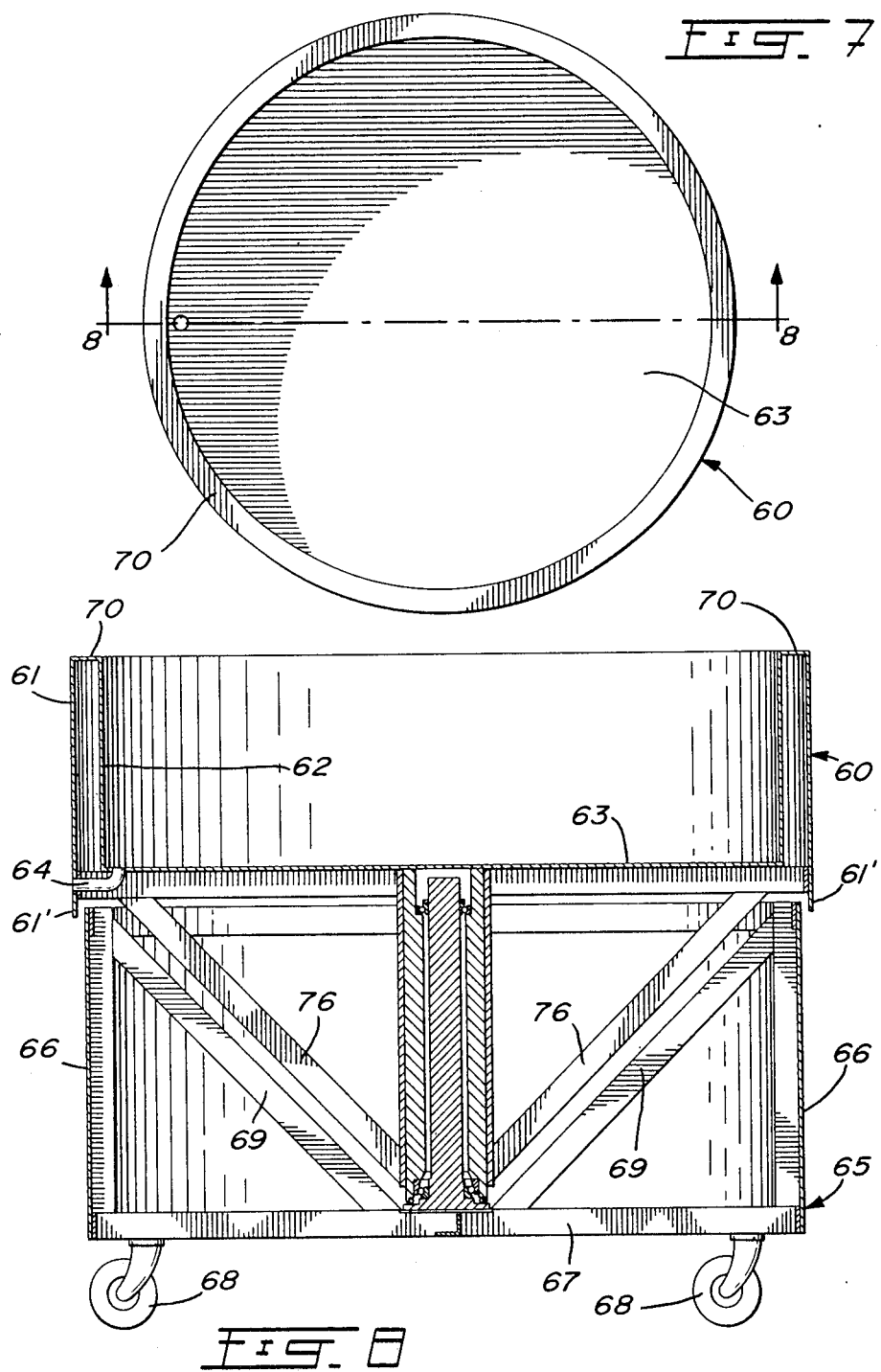

4,619,191

APPARATUS FOR THAWING, HANDLING AND REHEATING SEALED FROZEN FOOD PACKETS

FIELD OF THE INVENTION

The present invention relates generally to mechanical devices for handling food products, specifically to innovative apparatus for cooling and/or reheating and for handling prepared foodstuffs put into sealed bags and refrigerated until needed for use.

BACKGROUND OF THE INVENTION

The institutions such as hospitals, hotels, cafeterias, restaurants, etc., daily meals must be prepared for large numbers of people. The various consecutive stages of food preparation for these daily meals are known, for example, to blue-ribbon chefs. They know that the task of preparing meals becomes very significant in terms of man-hours in a large institution where up to ten thousand or even more meals are served every day. Thus, the various stages mentioned must be closely coordinated and rendered as efficient as possible to meet the needs. Even then, however, such activity remains time-consuming and labour-intensive.

Accordingly, it has been proposed to change conventional methods of food preparation by putting prepared or cooked foodstuffs into plastic bags which are then sealed, labeled and kept in a refrigerated accommodation until ready for use. The sealed food containing bags, normally called pouches, may be of any convenient small size containing one or more portions of a variety of menus. Such a method possesses the following advantages:

(a) rush preparation of meals to meet meal-time deadlines is eliminated;

(b) the distribution of meals is greatly simplified and also accelerated; and (c) the pouches effectively eliminate any chance of bacterial contamination, because the contents are not touched by human hands or exposed to any other source of contamination until the customers are ready to eat.

However, the above method involving refrigerated sealed pouches does create the new problem of quickly reheating the pouches to a desired temperature for serving and of quickly cooling the freshly-cooked foodstuffs prior to refrigeration of the same. Till now, this has been done by placing the pouches in still hot water or cold water baths; considerable time was required to obtain the desired change of pouch temperature. Also, the handling of the pouches was manual. It would therefore be highly desirable to have available a system or apparatus wherein the reheating and/or cooling of the pouches is greatly accelerated and the handling of the pouches is accelerated and simplified.

OBJECTS OF THE PRESENT INVENTION

It is a prime object of this invention to provide novel apparatuses adapted to quickly change the temperature of food pouches and mechanically transfer the pouches.

It is another important object of the invention to provide apparatuses of the above type which are adapted to function as an integrated system.

It is yet another important object of the invention to provide apparatuses of the above type which are simple in design and adapted to heat and/or cool and transfer a plurality of food pouches in a fast manner.

SUMMARY OF THE INVENTION

The above and other objects and advantages of the present invention are realized according to preferred embodiments of three distinct apparatuses, each of which constitutes a separate innovation but which nonetheless together determine a system for heating and/or cooling and for transferring food pouches of the type described above.

The first apparatus consists generally of a large bath supported by floor-engaging legs and being elongated with a bottom surface, parallel sides and opposite ends of which at least at their inner surfaces are rounded. The bath is formed with a pair of central, elongated and narrowly spaced-apart walls merging at their opposite ends, the latter being disposed inwardly of the opposite ends of the bath itself. Such construction defines an interior course. The bath is adapted to be filled with a hot or cold liquid (preferably water) which follows this course in either a clockwise or counterclockwise direction.

In order to achieve such movement of the liquid around the course, the inner surfaces of the bath sides are provided with a plurality of liquid-flow inducing means.

Each flow-inducing means includes a nozzle for directing a compressed gas into the liquid of the bath. There will thus occur a whirlpool effect in the bath as the heated or cooled liquid follows its course. The liquid in the bath is kept at the desired temperature by being recirculated through a heat exchanger.

The bath, being of sufficient size, is adapted to receive a plurality of food pouches as described above. Because each pouch is carried along by the moving liquid, it will tend to twist and turn heating or cooling faster and more evenly than if it were simply submerged in a non-moving liquid, as will be explained in more detail herebelow.

Preferably, the bath is provided with removable covers as well as ventilation means to remove vapor rising therefrom.

The second apparatus is a specially-adapted conveyor. The conveyor is mounted on a floor-engaging frame, consisting of an endless track having a plurality of catch members fixed thereto at regularly-spaced intervals. The conveyor is constructed and arranged to be tiltable from a generally horizontal position to an inclined postion, wherein one end thereof will be submerged in the bath described above and in position to remove properly re-heated or cooled pouches therefrom by means of the catch members which moves with the endless track. Power means are provided to move the track and reversibly tilt the same.

The third apparatus is designed to receive the pouches from the conveyor as they are removed from the hot bath and to transfer the heated pouches to a distribution conveyor belt or other means of distribution. This latter apparatus consists of a large vat mounted on a base.

Preferably, the vat is rotatable about its vertical axis over the base to ensure even distribution of the pouches in the vat as they are loaded as well as to facilitate their removal.

BRIEF DESCRIPTION OF THE DRAWINGS

The above will be more fully understood by having referral to the preferred embodiments of the invention, illustrated by way of the accompanying drawings, in which:

FIG. 1 is a perspective view of the bath, partially broken away;

FIGS. 2 and 3 depict a top plan view and side elevation respectively of the bath of FIG. 1, also showing in dashed outline the circulating food pouches therein;

FIG. 4 is a perspective view of the conveyor according to the invention;

FIG. 5 is a cross-sectional view of a portion of the bath of FIG. 1, also showing a portion of one end of the conveyor in tilted position in the bath;

FIG. 6 is a side elevation of the conveyor apparatus of FIG. 4, showing the tilted position of the same in dashed outline;

FIG. 7 is a top plan view of the vat; and

FIG. 8 is a cross-sectional view taken along line 8—8 of FIG. 7.

Like numerals indicate like elements throughout the drawings.

DETAILED DESCRIPTION OF THE PREFERRED EMBODIMENTS

The first apparatus or bath 1, shown in FIG. 1 to 3, is composed of a main body supported over a floor by legs 2 which are reinforced with struts 2'. The body is formed by parallel spaced-apart sides 3 which merge at their respective opposite ends to define rounded end portions 4, and a flat bottom surface 5. The upper and lower edges of sides 3 and end portions 4 are provided with perimetrically-extending rubber bumper strips 6.

The central area of the bath 1 includes two longitudinally-extending and narrowly spaced-apart walls 7 which merge at their opposite ends, the latter being spaced inwardly of their contiguous end portions 4. Walls 7 are strengthened by a plurality of cross ribs 8 and the space between them includes an overflow drain tube 9. Bath 1 is adapted to be filled with a hot or cold liquid, water being preferred. Thus, sides 3, and portions 4 and walls 7 define a course, as indicated by the curved arrows of FIG. 2. Bath 1 is preferably made of stainless steel. It is filled with liquid to the top edge of walls 7. The liquid is constantly recirculated through an exterior heat exhanger (not shown) to keep the water in the bath at the desired hot or cold temperature.

Bath 1 further comprises a plurality of liquid-flow inducing means 10 contained in a casing. Each casing is identical, being vertically oriented and located at intervals on the inner surfaces of sides 3 and end portions 4, as well as walls 7. Each casing 10 is formed of a first face 10' disposed at an obtuse angle to the surface to which it is secured. First face 10' has at least two vertically-spaced openings or slots 11, the latter being in registry with a·nozzle 11' (see FIG. 3) connected to compressed gas supply means (not shown). Casings 10 are located in walls 7, end portions 4 and sides 3. Each casing 10 is also formed of a second face 10" meeting the first face 10' at an approximate right angle, thereby defining a triangular cross-section for each casing 10. Compressed air from an outside supply (not shown) is directed through nozzles 11'. The air jets produce a tumbling effect on the pouches 14 and also the course flow of the water around the bath.

In order to have access to the fluid supply means as well as the interior portions of nozzles 11' for cleansing purposes, each casing 10 is made removable from bath 1. To remove any of the casings 10, the latter are secured in place by a pair of spaced flanges 12 arranged to define a space or slit into which the inner edges of faces 10', 10" are made slidable. An uppermost handle 13 is provided whereby an entire unit 10 may be pulled out of bath 1.

The angular orientations of nozzles 11' will create whirlpools and eddies in the course. Such action is desirable to quickly change the temperature of the food pouches 14 put into bath 1; the agitated course of the liquid causes pouches 14 to twist and turn, and to bump into sides 3, end portions 4 and walls 7 as well as bottom 5, Thus, the contents of pouches 14 are also subject to agitation. This action, it has been found, results in an even and rapid reheating or cooling of pouches 14. In contrast, merely submerging pouches 14 in hot or cold water requires more time and only reheats or cools the surface portion of the contents, while the interior remains at its original temperature over the same period of time.

FIG. 1 illustrates bath 1 as being provided with a central transverse cover plate 15 having a pipe 16 communicating with the interior of the bath and connected to a ventilation means, not shown. A pair of end cover plates 15' are hingedly secured to the edges of cover plate 15.

Bath 1 is designed to handle upwards of sixty pouches 14 simultaneously. However, the size of bath 1 may be modified according to particular requirements.

The dynamics of the air jets coming from nozzles 11', which affect the liquid in the bath, will now be detailed and are clearly illustrated in FIG. 2. The nozzles 11' of each individual casing 10 define an axis for the fluid jets produced which is at angle from corresponding side walls 3 and end walls 4. Each individual nozzle air jet produce a tumbling effect on the pouch 14 in the bath. Since there are nozzles 11' about both peripheral walls 3, 4 and about central wall 7, the pouches 14 will rotate. Further, as clearly seen in FIG. 2, since each nozzles 11' about walls 3, 4 define an air jet vector $\vec{V}_1$ defining one axis making an obtuse angle with another axis defined by the proximate air jet vector $\vec{V}_2$ generated by a proximate nozzle 11' about central wall 7, the resultant liquid course flow Vector V constituting the addition of successive first and second vectors, $V=\vec{V}_1+\vec{V}_2$, is substantially parallel to or along the center line of the interior course defined between walls 3, 4 and central wall 7.

Referring now to FIG. 4 to 6, there is shown the second apparatus or conveyor 20. The latter includes a floor-engaging support cart 21 and a conveyor assembly 22 supported on top of the cart.

Cart 21 includes three upright corner posts 23 joined at their respective upper and lower ends by horizontal members 24 on three sides. A fourth post 25 with a top horizontal elbow 26 carries the controls 27 for the conveyor assembly 22. All four posts 23, 25 are fitted with lowermost swivel wheels 23' for easy displacement of apparatus 20. A rectangular front frame 23a, 24a is hinged to front post 23 for pivotal movement from the right angle position, shown in FIG. 4, to a folded position along the inside of post 25, as shown by arrow A. A tool box 21' is provided in cart frame 21.

Conveyor assembly 22 is mounted over cart 21 and at one side thereof, as best seen in FIG. 4. Assembly 22 includes a fixed chassis formed of a first pair of parallel panels 28 (only one being shown in the figures), each being rigidly attached to cart 21 at the rear portion thereof and each having a vertical lower portion, a slightly outwardly-extending middle portion and a more inclined upper flange portion. A second pair of panels 29 (again only one being shown) are secured to outer sides of the first pair of panels 28 and to cart 21. Panels 29 terminate short of panels 28 with respect to height and are also longer, having a downwardly tapering upper edge 29' at their front portions.

Secondly, conveyor assembly 22 includes a movable chassis consisting of a third pair of panels 30, 31 conforming in shape to the first pair of panels and extending longitudinally immediately inwardly of the latter. Panels 30, 31 support between them an endless track 32 trained around a front roller 33 and middle and rear rollers (not shown) according to known endless track construction. A track tensioning means 34 is provided adjacent the front roller 33.

Track 32 is provided with a plurality of orthogonally projecting and regularly-spaced catch members 35 which are rectangular in shape and have preferably slightly curved vertical consituents.

The front ends of both panels 30, 31 are formed with downwardly extending feet segments 36, 37 respectively terminating in pads 38 at their extremities and joined by a link 39. Segments 36, 37 are inclined to the vertical at an optimum angle of approximately 25 degrees.

In FIG. 4, the upper edge of the left foot segment 36 is shown as having a deflector flange 40 while the right foot segment's upper edge has another, wider deflector flange 41 formed with a plurality of holes 42. Holes 42 allow the liquid of bath 1 to flow therethrough unimpededly when the front end of assembly 22 is in inclined position in bath 1 (see FIGS. 2, 5 and 6.

Thirdly, assembly 22 includes tilting means for the movable chassis, shown in FIGS. 4 and 6. The tilting means is comprised of a pair of rigid vertical bars 43 secured at their lower ends to the rear of panels 28 and rigidly joined at their upper ends by a transverse bar 44.

A rigid crane arm or boom 45 is pivotally attached to the middle of bar 44 for vertical movement and extends forwardly over endless track 32. Arm 45 is bent downwardly at substantially one half of its length and is reinforced by an overlying structural member 46. The front end of crane arm 45 pivotally supports a fork member 47 which is in turn reinforced by a transverse brace 48. The two lower ends of fork members 47 are pivotally secured to the outer sides of their respective panels 30 and 31 for transverse pivoting relative thereto.

A power means is provided to raise and lower crane arm 45, consisting of an upright hydraulic cylinder 49 having a piston rod 49' pivotally secured by a U-shape pivot connection 50 to the elbow of arm 45. The opposite end of cylinder 49 is pivotally secured to a rigid, transverse and horizontal stay 51, the latter having rigid depending fastening members 52 which are welded or otherwise fastened to panels 28, 29 on both sides of assembly 22.

The movable chassis is pivotally secured to the fixed chassis described above, on both sides thereof, by pivots 53 (one being shown) located slightly forwardly of fastening members 52. A rigid stop strip 55 is fixed to the side of panel 30 and downwardly extends to abut top bar 24a in the elevated position of conveyor assembly 22. Therfore, no power is required to maintain assembly 22 in rest position.

Hydraulic cylinder 49 is hydraulically connected by way of hoses (not shown) to control 27. Power means to control the movement of endless track 32 are further provided including an electric motor driving a hydraulic pump (not shown) located in a casing 54 at the rear end of cart 21 and a hydraulic motor (not shown) driven by the pump and driving the rear roller of the endless track 32. The pump also activates cylinder 49.

FIG. 4 and FIG. 6 show the movable chassis and endless track 32 in horizontal rest position, with the piston rod 49' fully extended.

For use, the power means are activated to keep conveyor assembly in horizontal position, frame 23a, 24a folded along arrow A, cart 21 is wheeled over the end of bath. Frame 23a, 24a thus clears both the bath and the conveyor assembly 22.

When cylinder 49 is actuated to release and retract piston rod 49', crane arm 45 gradually lowers frontwardly, thereby allowing the front end of the movable chassis to tilt downwardly about pivots 53 until it reaches the limit inclined position shown by the dashed outline in FIG. 6. In such tilted position, pads 38 rest on the bath bottom and on the side of the bath downstream from the water flow as shown in dashed outline in FIG. 2. Therefore, endless track 32 is adapted to catch and lift pouches 14 as they circulate in bath 1 toward track 32.

The third apparatus according to the invention is depicted in FIGS. 7 and 8. It is embodied by a transfer vat 60, of circular shape. Vat 60 has double circumferential walls 61, 62 joined by an annular flange 70 for insulation purposes and a flat, circular floor 63. The lower portion of outer wall 61 defines a circumferential flange 61'. A drain pipe 64 opens in flange 61' and also communicates with the interior space of vat 60, as shown.

Vat 60 is rotatably mounted on a base 65, so that it can be manually rotated about its vertical axis. Base 65 is also circular, being of slightly smaller diameter than vat 60, having a wall 66, a bottom plate 67 and, preferably, four spaced pivotal wheels 68, so that vat 60 can be easily moved to a desired location. Base 65 is further formed with a plurality of inclined bracing beams 69, each having opposite ends fixed to the upper portion of wall 66 and the central area of bottom plate 67, respectively. Collectively, beams 69 define a conical shape.

Rigidly secured to the center of bottom plate 67 and projecting uprightly therefrom, is a solid shaft 71.

The shaft 71 is surrounded by a rigid hollow second shaft 72, having an upper end fixed to floor 63 at the center thereof and a bottom end terminating at the base of the first-named shaft 71. The two shafts 71, 72 are provided between them, with upper and lower annular bearings 73, 74 respectively, as well as lowermost bearings 75. Thus, vat 60 can be rotated about base 65 to place and remove pouches 14. (Vat 60 is similarly provided with a pluratliy of inclined bracing beams 76).

Preferably, vat 60 is high enough above a floor to render unnecessary any bending over by a worker.

The three apparatuses described herein are adapted to function together as a mechanized system for quickly heating and cooling and for transfering food pouches 14. It is to be noted, however, that the apparatuses can be used independently or combined according to the work to be done. For example, bath 1 may be used only with conveyor 20; or vat 60 can be used only with conveyor 20.

What we claim is:

1. An apparatus for changing the temperatures of a plurality of sealed food pouches, comprising: a large bath formed of a bottom surface and of an exterior wall including elongated parallel sides and opposite ends of which at least their inner surfaces are rounded; a central, elongated wall spaced inwardly of the exterior wall including its ends; such construction defining an interior closed course; said bath being adapted to contain a liquid with said food pouches immersed therein; a plurality of identical flow-inducing means, disposed at both said exterior wall and said central wall at spaced locations along said walls and directed angularly and in the same direction relative to said course, each said flow-inducing means including a nozzle, said nozzle located in a casing formed of a first face disposed at an obtuse angle relative to said course and having at least one slot formed therein and in registry with said nozzle; said nozzle communicating with a compressed gas supply; a second face disposed at a right angle to said first face, thereby defining a casing of triangular cross-section; whereby whirlpool effects are created as said liquid circulates around the course to heat or cool each said sealed food pouch thoroughly and rapidly.

2. The apparatus of claim 1, wherein the surface to which each said casing is secured is provided with a pair of spaced vertical flanges into which the respective edges of said first face and said second face slidably fit; whereby each said casing may be removed as desired; the top face of each said casing being provided with a handle for such removal from said bath.

3. An apparatus for changing the temperature of a plurality of sealed food pouches, comprising: a large bath formed of a bottom surface and of an exterior wall including elongated parallel sides and opposite ends of which at least their inner surfaces are rounded, said bath provided with a central transverse cover plate having ventilation means formed therewith; and a pair of end over plates hingedly secured to either side of said central cover plate; a central elongated wall spaced inwardly of said exterior wall including its ends; such construction defining an interior closed course; said bath being adapted to contain a liquid with said food pouches immersed therein; a plurality of identical flow-inducing means, disposed at both said exterior wall and said central wall at spaced locations along said walls and directed angularly and in the same direction relative to said course; whereby whirlpool effects are created as said liquid circulates around the course to heat or cool each said sealed food pouch thoroughly and rapidly.

4. An apparatus for changing the temperature of a plurality of sealed food pouches, comprising: a large bath formed of a bottom surface and of an exterior wall including elongated parallel sides and opposite ends of which at least their inner surfaces are rounded; a central elongated wall spaced inwardly of said exterior wall including its ends; such construction defining an interior closed course; said bath being adapted to contain a liquid with said food pouches immersed therein; a plurality of identical flow-inducing means, disposed at both said exterior wall and said central wall at spaced locations along said walls and directed angularly and in the same direction relative to said course; whereby whirlpool effects are created as said liquid circulates around the course to heat or cool each said sealed food pouch thoroughly and rapidly.

5. Heat exchange apparatus comprising an elongated bath formed of a main floor with an upright peripheral wall defining integral parallel side walls and inwardly concave end walls, an elongated central upright wall member on said floor and in registry with, of the same length as and extending parallel to and being equally spaced from either of said side walls, such construction defining a closed circuit interior course; said bath adapted to contain sealed food pouches imersed in a liquid; a first series of pressurized fluid means spacedly mounted along the inner face of said bath side walls and end walls, a second series of pressurized fluid means, mounted on the outer faces of said central wall member, the pressurized fluid means of said first and second series producing corresponding first and second liquid flow vectors each at an acute angle and in the same direction relative to the center line of said interior course, said first and second vectors cooperating in the production of a tumbling effects on said pouches in said liquid and of a course flow of the liquid along said interior course, wherein thermal transfer is accelerated between the food item in the pouch and the ambient liquid.

* * * * *